(12) United States Patent
Stein et al.

(10) Patent No.: US 11,811,742 B2
(45) Date of Patent: *Nov. 7, 2023

(54) METHODS, SYSTEMS, AND MEDIA FOR RECOVERING IDENTITY INFORMATION IN VERIFIABLE CLAIMS-BASED SYSTEMS

(71) Applicant: Google LLC, Mountain View, CA (US)

(72) Inventors: David Stein, New York, NY (US); John Wittrock, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 74 days.

This patent is subject to a terminal disclaimer.

(21) Appl. No.: 17/460,860

(22) Filed: Aug. 30, 2021

(65) Prior Publication Data
US 2021/0392126 A1    Dec. 16, 2021

Related U.S. Application Data

(63) Continuation of application No. 16/704,602, filed on Dec. 5, 2019, now Pat. No. 11,108,760.

(60) Provisional application No. 62/775,887, filed on Dec. 5, 2018.

(51) Int. Cl.
*H04L 9/40* (2022.01)

(52) U.S. Cl.
CPC .................................. *H04L 63/08* (2013.01)

(58) Field of Classification Search
CPC ...................................... H04L 63/08
USPC ............................................. 726/6
See application file for complete search history.

(56) References Cited

U.S. PATENT DOCUMENTS

| | | | |
|---|---|---|---|
| 8,386,773 B2 | 2/2013 | Sherkin et al. |
| 8,600,062 B2 | 12/2013 | Rae et al. |
| 8,621,222 B1 | 12/2013 | Das |
| 8,776,186 B2 | 7/2014 | Resch et al. |
| 8,904,545 B2 | 12/2014 | DeMartini et al. |

(Continued)

OTHER PUBLICATIONS

International Preliminary Report on Patentability dated Jun. 17, 2021 in International Patent Application No. PCT/US2019/064674, pp. 1-8.

(Continued)

*Primary Examiner* — Teshome Hailu
(74) *Attorney, Agent, or Firm* — Lerner David LLP

(57) ABSTRACT

Methods, systems, and media for recovering identity information in verifiable claims-based systems are provided. In some embodiments, the method comprises: determining that a graph of interdependencies between a plurality of issuers and a plurality of claims for a holder is to be reconstructed; restoring a root credential; transmitting a plurality of messages that are each signed with the root credential to a plurality of backup providers, wherein each of the plurality of backup providers has a portion of the graph of interdependencies between the plurality of issuers and the plurality of claims for the holder stored in a storage device; receiving a plurality of graph portions from at least a portion of the plurality of backup providers in response to each of the portion of the plurality of backup providers determining that the root credential is a correct root credential corresponding to the holder; and reconstructing the graph of interdependencies between the plurality of issuers and the plurality of claims for the holder using the plurality of received graph portions.

21 Claims, 8 Drawing Sheets

(56) References Cited

U.S. PATENT DOCUMENTS

| | | |
|---|---|---|
| 10,068,228 B1* | 9/2018 | Winklevoss .......... H04L 9/3239 |
| 2007/0168656 A1 | 7/2007 | Paganetti et al. |
| 2014/0136838 A1 | 5/2014 | Mossbarger |
| 2016/0191253 A1 | 6/2016 | Pyle |
| 2018/0069697 A1 | 3/2018 | Di Nicola et al. |
| 2018/0159844 A1 | 6/2018 | Barfonchovski et al. |
| 2018/0240101 A1* | 8/2018 | Chan .................. G06Q 20/3224 |
| 2019/0034917 A1 | 1/2019 | Nolan et al. |
| 2019/0190701 A1* | 6/2019 | Mitra ..................... G06N 5/022 |
| 2019/0245688 A1 | 8/2019 | Patin |
| 2019/0311336 A1* | 10/2019 | Kim .................. G06Q 20/3678 |
| 2019/0392406 A1* | 12/2019 | Deshpande ........ G06Q 20/3674 |

OTHER PUBLICATIONS

International Search Report and Written Opinion dated Feb. 6, 2020 in International Patent Application No. PCT/US2019/064674, pp. 1-13.

Notice of Allowance dated Apr. 28, 2021 in U.S. Appl. No. 16/704,602, pp. 2-3.

Office Action dated Jun. 1, 2020 in U.S. Appl. No. 16/704,602, pp. 2-9.

Office Action dated Sep. 25, 2020 U.S. Appl. No. 16/704,602, pp. 2-12.

* cited by examiner

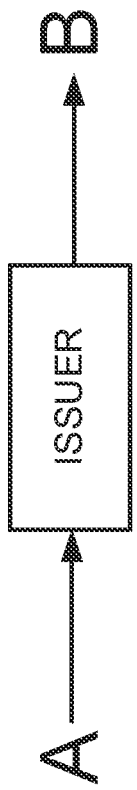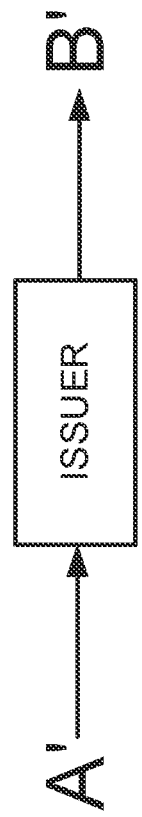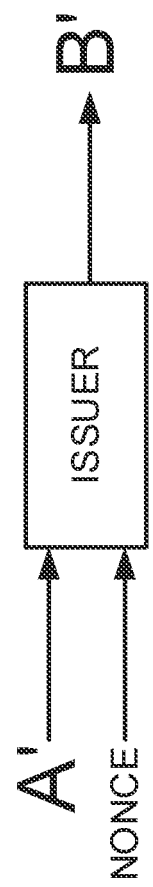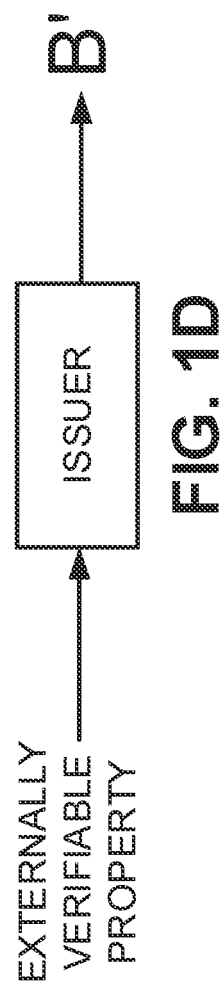

METHODS, SYSTEMS, AND MEDIA FOR RECOVERING IDENTITY INFORMATION IN VERIFIABLE CLAIMS-BASED SYSTEMS

CROSS-REFERENCE TO RELATED APPLICATIONS

This application is a continuation of U.S. patent application Ser. No. 16/704,602, filed Dec. 5, 2019, which claims the benefit of U.S. Provisional Patent Application No. 62/775,887, filed Dec. 5, 2018, each of which is hereby incorporated by reference herein in its entirety.

TECHNICAL FIELD

The disclosed subject matter relates to methods, systems, and media for recovering identity information in verifiable claims-based systems.

BACKGROUND

People frequently carry multiple forms of identification or multiple proofs of membership with them. For example, a person can carry a driver's license, which may be used for multiple purposes, such as to rent a car, to provide proof of age, etc. As another example, a person can carry multiple membership cards corresponding to different entities or businesses, such as a gym membership card, a discount card for a particular store, and/or any other suitable types of cards. It can, however, be cumbersome to carry so many different forms of identification. Additionally, in some cases, a particular aspect of a user identity may need to be verified (e.g., that a person is over the age of twenty-one years old, that a person's is greater than a voting age, etc.), but, when proving the particular aspect, that person may end up revealing additional identity information. For example, to provide a form of verification that a person is over the age of twenty-one years old, the person may present a driver's license, which may also reveal the person's address, the person's characteristics, the person's legal name, the person's organ donation option information, or other personal information. However, such individuals may desire to keep such identifying information private.

Some solutions include credentials that can encode user attributes in which a user can minimally disclose information about what attributes are encoded in a token in response to dynamic verifier policies. For example, a user may choose to only disclose a subset of the encoded attributes by providing that the user's undisclosed name does not appear on a blacklist and that the user's age is greater than a particular age without disclosing the user's birthdate. This can include having the user storing their identity physically on their person in a computing device such as a mobile device or smart card. Such solutions, however, run into significant issues when recovering a user's collection of identities if that user's storage device (e.g., mobile device, smart card, etc.) is lost, compromised, or damaged.

Accordingly, it is desirable to provide new methods, systems, and media for recovering identity information in verifiable claims-based systems.

SUMMARY

Methods, systems, and media for recovering identity information in verifiable claims-based systems are provided.

In accordance with some embodiments of the disclosed subject matter, a method for restoring user credentials is provided, the method comprising: determining, using a hardware processor, that a graph of interdependencies between a plurality of issuers and a plurality of claims for a holder is to be reconstructed; restoring, using the hardware processor, a root credential; transmitting, using the hardware processor, a plurality of messages that are each signed with the root credential to a plurality of backup providers, wherein each of the plurality of backup providers has a portion of the graph of interdependencies between the plurality of issuers and the plurality of claims for the holder stored in a storage device; receiving, using the hardware processor, a plurality of graph portions from at least a portion of the plurality of backup providers in response to each of the portion of the plurality of backup providers determining that the root credential is a correct root credential corresponding to the holder; and reconstructing, using the hardware processor, the graph of interdependencies between the plurality of issuers and the plurality of claims for the holder using the plurality of received graph portions.

In some embodiments, the method further comprises transmitting a request to each of the plurality of issuers in the graph of interdependencies between the plurality of issuers and the plurality of claims for the holder, wherein the request includes at least one claim from the plurality of claims for the holder.

In some embodiments, the method further comprises: receiving, from an issuer device, derived credentials relating to a reissued verifiable claim; and restoring a claim in the graph of interdependencies between the plurality of issuers and the plurality of claims for the holder with the reissued verifiable claim.

In some embodiments, each of the plurality of claims is data demonstrating a property signed by an issuer.

In some embodiments, the plurality of issuers include a subset of root issuers and a subset of depending issuers, wherein each of the subset of root issuers requires a demonstration of identity by the holder, and wherein each of the subset of depending issuers generates and provides a reissued verifiable claim without user action.

In some embodiments, the graph of interdependencies between the plurality of issuers and the plurality of claims for the holder is reconstructed by tracing dependency chains in a backwards direction from a depending issuer from the plurality of issuers.

In some embodiments, the graph of interdependencies between the plurality of issuers and the plurality of claims for the holder is reconstructed by tracing dependency chains in a forward direction from a root issuer from the plurality of issuers.

In some embodiments, each of the plurality of messages that is signed with the root credential is combined with user-specific information. In some embodiments, the user-specific information is biometric data. In some embodiments, the user-specific information is a user-provided password.

In accordance with some embodiments of the disclosed subject matter, a system for restoring user credentials is provided, the system comprising a hardware processor that is configured to: determine that a graph of interdependencies between a plurality of issuers and a plurality of claims for a holder is to be reconstructed; restore a root credential; transmit a plurality of messages that are each signed with the root credential to a plurality of backup providers, wherein each of the plurality of backup providers has a portion of the graph of interdependencies between the plurality of issuers and the plurality of claims for the holder stored in a storage device; receive a plurality of graph portions from at least a portion of the plurality of backup providers in response to each of the portion of the plurality of backup providers determining that the root credential is a correct root credential corresponding to the holder; and reconstruct the graph of interdependencies between the plurality of issuers and the plurality of claims for the holder using the plurality of received graph portions.

In accordance with some embodiments of the disclosed subject matter, a non-transitory computer-readable medium containing computer executable instructions that, when executed by a processor, cause the processor to perform a method for restoring user credentials is provided, the method comprising: determining that a graph of interdependencies between a plurality of issuers and a plurality of claims for a holder is to be reconstructed; restoring a root credential; transmitting a plurality of messages that are each signed with the root credential to a plurality of backup providers, wherein each of the plurality of backup providers has a portion of the graph of interdependencies between the plurality of issuers and the plurality of claims for the holder stored in a storage device; receiving a plurality of graph portions from at least a portion of the plurality of backup providers in response to each of the portion of the plurality of backup providers determining that the root credential is a correct root credential corresponding to the holder; and reconstructing the graph of interdependencies between the plurality of issuers and the plurality of claims for the holder using the plurality of received graph portions.

In accordance with some embodiments of the disclosed subject matter, a system for restoring user credentials is provided, the system comprising: means for determining that a graph of interdependencies between a plurality of issuers and a plurality of claims for a holder is to be reconstructed; means for restoring a root credential; means for transmitting a plurality of messages that are each signed with the root credential to a plurality of backup providers, wherein each of the plurality of backup providers has a portion of the graph of interdependencies between the plurality of issuers and the plurality of claims for the holder stored in a storage device; means for receiving a plurality of graph portions from at least a portion of the plurality of backup providers in response to each of the portion of the plurality of backup providers determining that the root credential is a correct root credential corresponding to the holder; and means for reconstructing the graph of interdependencies between the plurality of issuers and the plurality of claims for the holder using the plurality of received graph portions.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIGS. 1A-1D show schematic diagrams of various interactions between an issuer and a holder in accordance with some embodiments of the disclosed subject matter.

DETAILED DESCRIPTION

Figure 2A:
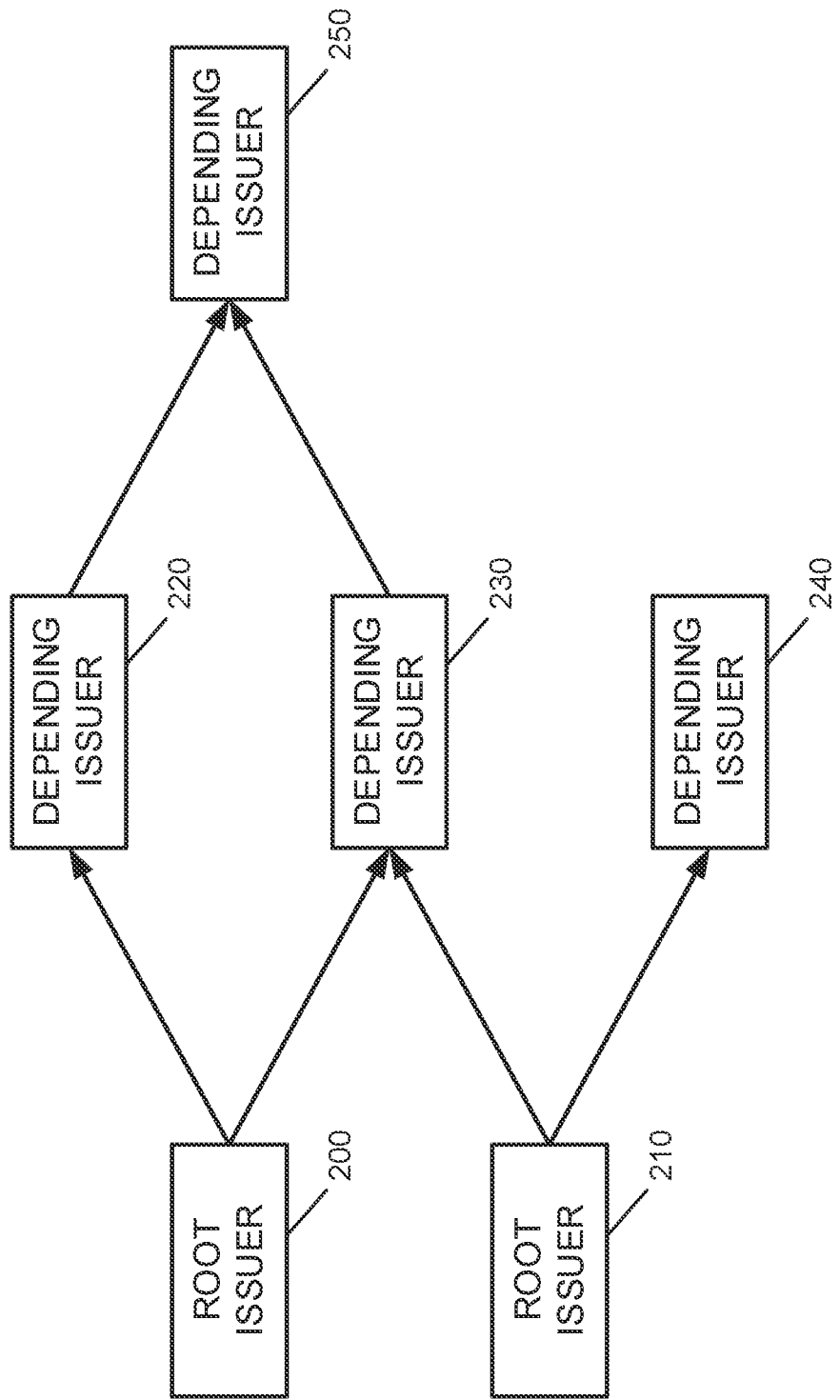
FIGS. 2A-2C show an illustrative graph of interdependencies between issuers and claims for a holder in which a backwards trace can be used to restore identity information in accordance with some embodiments of the disclosed subject matter.

In accordance with various embodiments, mechanisms (which can include methods, systems, and media) for recovering identity information in verifiable claims-based systems are provided.

Generally speaking, the mechanisms described herein generally relate to using a digital wallet application executing on a user device to locally reconstruct a graph of interdependencies between issuers and claims for a holder. This can include, for example, a user of a user device restoring a root credential and, once the user has restored their root credential, transmitting messages signed with their root credential to multiple backup providers, where each backup provider has stored a portion of the graph associated with the user (e.g., dependency descriptors blocks). In response to each backup provider determining that the message has been signed with the correct root credential, each backup provider can transmit its portion of the graph to the user device for reconstruction. Upon reconstructing the graph on the user device using the portions of the graph from each of the backup providers, the digital wallet application executing on the user device can also transmit requests to each issuer in the graph, where the request can include the necessary credentials, claims, and/or demonstrations. In response, each issuer device can transmit derived credentials, such as information relating to a reissued verifiable claim, for restoring the graph on the user device.

Verifiable Claims

In some embodiments, the mechanisms described herein can include features relating to verifiable claims.

As used herein, a verifiable claim generally refers to data that can be used to demonstrate a property signed by an authority. For example, a province or state entity can assert that an individual is over the age of 25 years of age and can drive a motor vehicle. In continuing this example, the individual can use this claim to rent a vehicle from a rental agency.

As used herein, an issuer generally refers to an authority or any other suitable entity that issues a verifiable claim. For example, as used in the above-mentioned example, an issuer can be the province or state entity (e.g., the province of Ontario, the state of New York, etc.).

It should be noted that, in some embodiments, an issuing device can be associated with any suitable organization or entity. For example, in some embodiments, the issuing device can be associated with a government (e.g., a local government, a national government, and/or any other suitable type of government). In some such embodiments, the issuing device can issue user credentials related to authorizations given by the government and/or information stipulated by the government. As another example, in some embodiments, the issuing device can be associated with an organization associated with a building the user of the user device lives in. In some such embodiments, the issuing device can issue user credentials related to authorizations given by management of the building, such as locations within the building the user is allowed to access, and/or any other suitable type of user credentials.

As used herein, a holder generally refers to an entity that carries a verifiable claim. For example, as used in the above-mentioned example, a holder can be the individual (e.g., Person A).

As used herein, a digital wallet generally refers to a collection of verifiable claims associated with a single holder. For example, a digital wallet application executing on a user device of a holder can access, store, manage, and/or reconstruct the collection of verifiable claims associated with the single holder.

It should be noted that identifying information can include different types of identifying information (e.g., a name of a user, a birthdate of a user, an address of the user, a citizenship of a user, and/or any other suitable identifying information), information indicating activities that a user is authorized to perform (e.g., drive, borrow books from a particular library, and/or any other suitable activities), user accounts associated with different businesses or services (e.g., a bank account, an account associated with a vehicle sharing service, a gym membership, and/or any other suitable types of accounts), and/or any other suitable type of information.

Interactions Between an Issuer and a Holder

As shown in FIGS. 1A-1D, an issuer can generate and provide a verifiable claim to a holder. An issuer does this, for example, upon having a particular confidence that a holder's claim is valid based on one or more out-of-band interactions. For example, upon taking and passing driving test (e.g., a written examination and a road test) and upon presenting a required form of identification (e.g., a birth certificate), the state of New York can provide the holder with a license asserting that the holder can drive a particular type of automobile on public roadways. In another example, a friend of a holder can provide permission to enter the friend's apartment on Wednesdays (or any other particular day or time) to take the friend's dog for a walk.

It should be noted that this interaction in which one provides one or more claims and/or demonstrations to an issuer (A) and the issuer generates and provides a new verifiable claim (B) can be represented by the interaction in FIG. 1A.

FIGS. 1B-1D show illustrative interactions when a verifiable claim is lost, compromised, or damaged and the holder of the verifiable claim seeks recovery of the verifiable claim.

As shown in FIG. 1B, in some embodiments, the holder can demonstrate a verifiable property (A') that provides to the issuer that the holder is the same person at (A) that previously provided the one or more claims and/or demonstrations to the issuer. In response to demonstrating this verifiable property (A'), the issuer can re-issue the claim (B'). For example, in response to providing one or more forms of government-issued identification, such as a passport, the issuer can provide a new driver's license given that the individual has already passed the driving test.

It should be noted that this interaction in which one provides one or more verifiable properties (A') to an issuer and the issuer generates and provides a new verifiable claim (B') can be represented by the interaction in FIG. 1B.

As shown in FIG. 1C, in some embodiments, the holder can re-establish that the holder is qualified for a user credential and provide an identifier that allows the issuer to generate and provide a new verifiable claim (B') with similar properties. For example, in response to providing a verifiable property (A') and in response to providing a second factor (e.g., biometric data associated with the user, a user-provided password, a cryptographic nonce or any other suitable cryptographic data, etc.), the issuer can provide a new verifiable claim.

It should be noted that this interaction in which one provides one or more verifiable properties (A') and a second factor (e.g., a cryptographic nonce or any other suitable cryptographic data) to an issuer and the issuer generates and provides a new verifiable claim (B') can be represented by the interaction in FIG. 1C.

As shown in FIG. 1D, in some embodiments, the holder can, similar to FIG. 1A, re-establish the holder with the issuer. For example, the holder can perform an identical process as to when the holder originally received the verifiable claim (B). It should be noted that, in this instance, the issuer does not use a claim held by the holder to establish trust. As described hereinbelow, this generally occurs for root issuers.

It should be noted that this interaction in which one provides one or more externally verifiable properties to an issuer and the issuer generates and provides a new verifiable claim (B') can be represented by the interaction in FIG. 1D.

Illustrative Embodiments

Generally speaking, in a graph of interdependencies between issuers and claims for a holder, there can be a small number of root issuers, such as root issuer 200 and root issuer 210 in FIGS. 2A-2C and FIGS. 3A-3B, in which a more substantial combination of claims and/or demonstrations of identity information may be required in comparison with depending issuers. For example, such root issuers may require an extensive in-person demonstration of identity (see, e.g., the interaction shown in FIG. 1D). It should be noted that, in a graph of interdependencies between issuers and claims for a holder, there can generally be a larger number of depending issuers, such as depending issuer 220, 230, 240, and 250 in FIGS. 2A-2C and FIGS. 3A-3B, in which a depending issuer can reissue their claims with little or no user action needed given the assurances of one or more root issuers. For example, such depending issuers may require little or no user action to generate and provide a reissued verifiable claim (see, e.g., the interactions shown in FIGS. 1B and 1C).

In some embodiments, when restoring identity information, the mechanism can include tracing backwards in the graph of interdependencies between issuers and claims for a holder from an issuer.

Figure 2B:
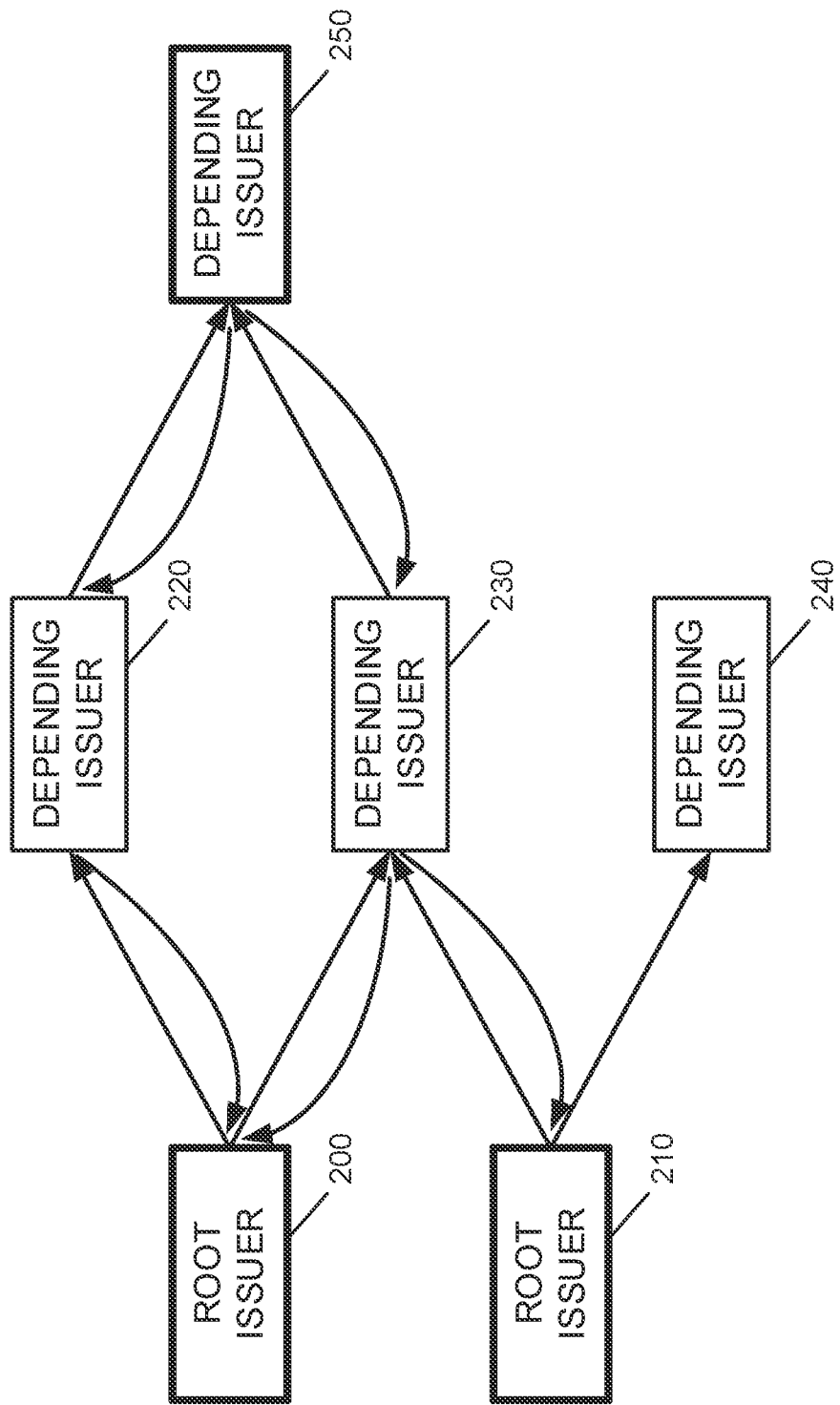
Figure 2C:
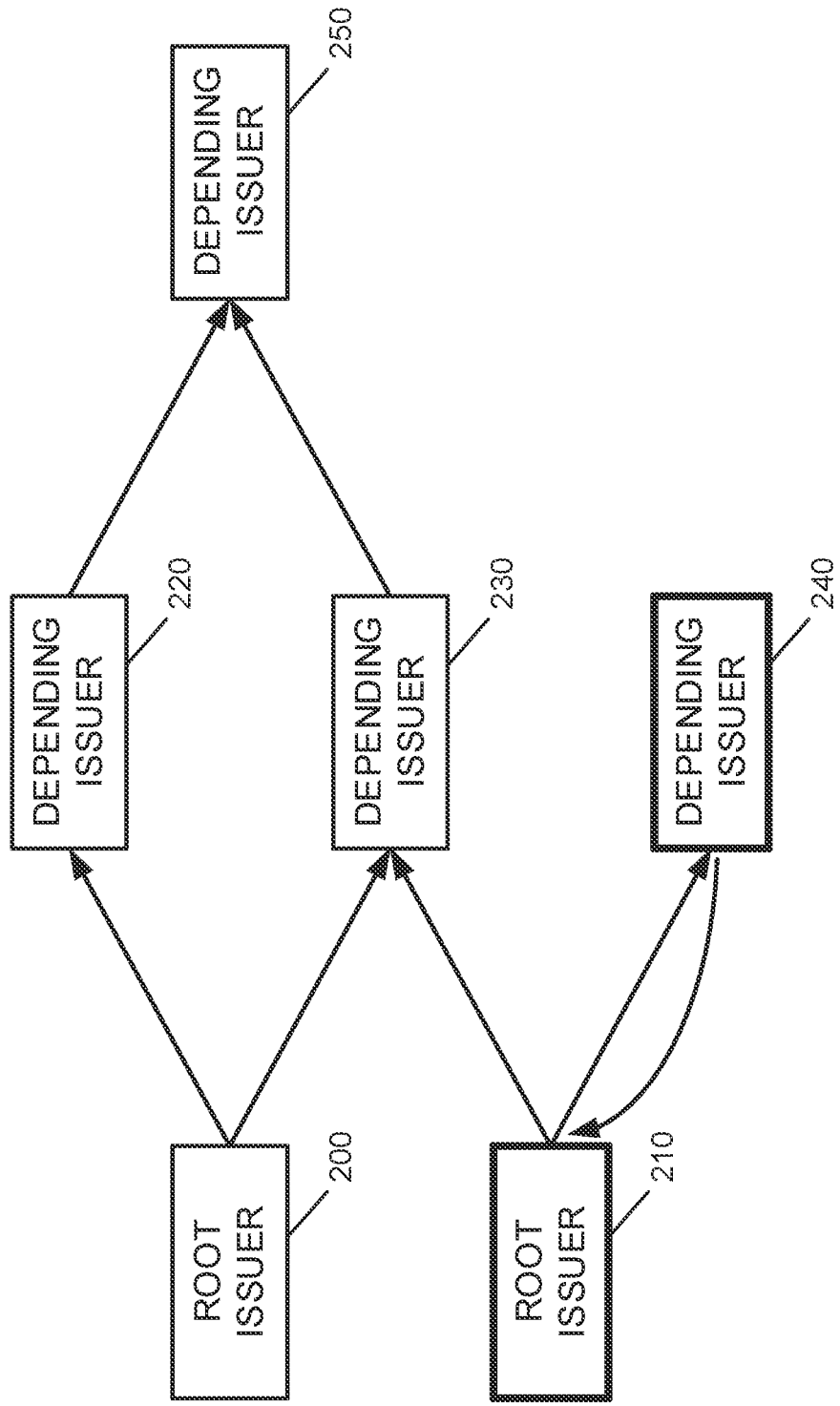

In a particular example, as shown in FIG. 2B, the mechanism can trace backwards from depending issuer 250. As shown by the arrows in FIG. 2B, the mechanism can trace a dependency chain from depending issuer 250 to depending issuer 220 and from depending issuer 220 to root issuer 200. As also shown by the arrows in FIG. 2B, the mechanism can trace a dependency chain from depending issuer 250 to depending issuer 230 and from depending issuer 230 to both root issuer 200 and root issuer 210. As further shown by the arrows in FIG. 2C, the mechanism can trace a dependency chain from depending issuer 240 to root issuer 210. These traces can establish the set of claims that needs user intervention to restore dependencies.

It should be noted that, although FIGS. 2A-2C and FIGS. 3A-3B show two root issuers, four depending issuers, and dependency chains of varying length, this is merely illustrative. Any suitable number of root issuers, any suitable number of depending issuers, and any suitable length of a dependency chain can be provided. In addition, it should be noted that multiple root issuers can provide sufficient identification information (e.g., multiple root authorities can attest to an age of a user).

Additionally or alternatively, in some embodiments, when restoring identity information, the mechanism can include restoring the graph of interdependencies between issuers and claims for a holder in response to a visitation of a root issuer. For example, the mechanism can restore at least a portion of the graph for a holder in response to every visitation of a root issuer. In another example, the mechanism can restore at least a portion of the graph for a holder in response to visiting a particular root issuer.

Figure 3A:
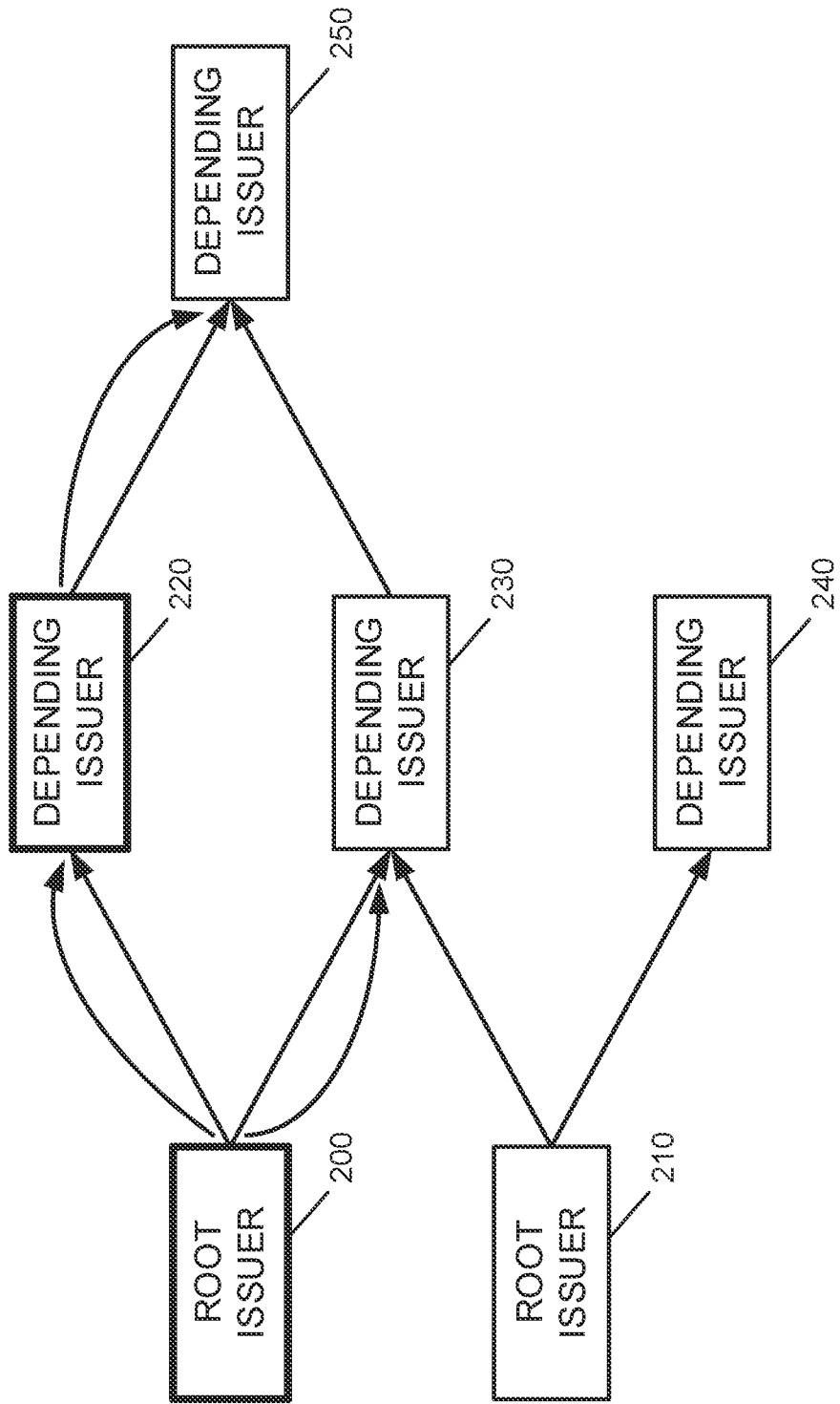
FIGS. 3A and 3B show an illustrative graph of interdependencies between issuers and claims for a holder in which a dependency chain can be restored in response to visiting a root issuer in accordance with some embodiments of the disclosed subject matter.
Figure 3B:
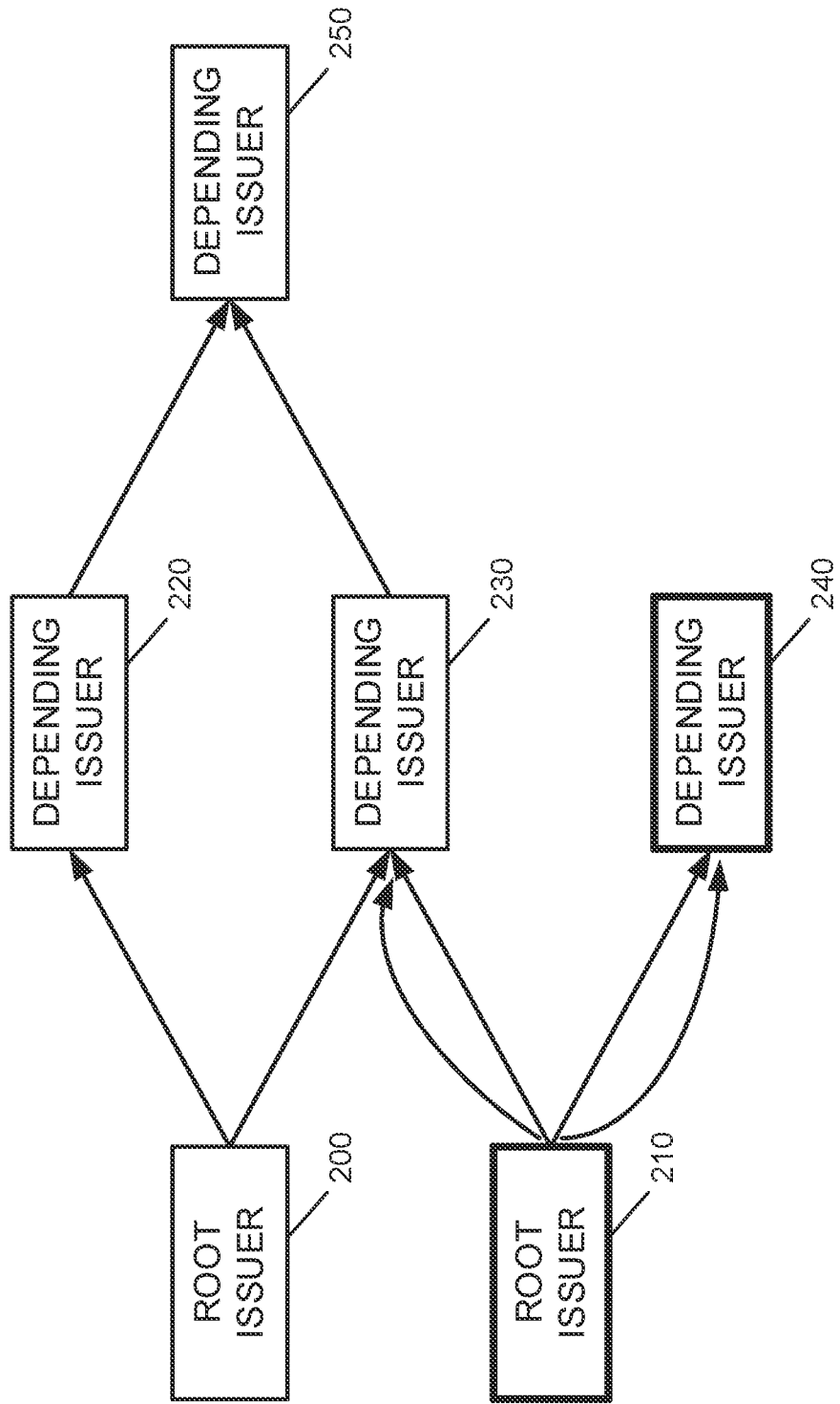

In a more particular example, as shown in FIG. 3A, in response to visiting root issuer 200, the mechanism can include restoring one or more dependency chains in the graph of interdependencies from root issuer 200—e.g., a dependency chain from root issuer 200 to depending issuer 220 and then to depending issuer 250; a dependency chain from root issuer 200 to depending issuer 230; etc. In another example, as shown in FIG. 3B, in response to visiting root issuer 210, the mechanism can include restoring one or more dependency chains in the graph of interdependencies from root issuer 210—e.g., a dependency chain from root issuer 210 to depending issuer 230 and a dependency chain from root issuer 210 to depending issuer 240.

Additionally or alternatively, in some embodiments, the mechanisms described herein can implement a hybrid approach that restores the graph of interdependencies between issuers and claims for a holder by using a combination of (i) tracing dependency chains in a backwards direction from a depending issuer in the graph of interdependencies between issuers and claims for a holder and (ii) restoring dependency chains in a forward direction in response to visiting a root issuer in the graph of interdependencies between issuers and claims for a holder.

It should be noted that any suitable criterion can be used to determine how to implement the hybrid approach for restoring the identity graph. For example, in response to determining that a new claim has been issued, the mechanism can resolve as far as possible. In another example, in response to determining that a still-unreissued claims is being requested, the mechanism can provide guidance on what is needed to restore the claim.

In some embodiments, the mechanisms described herein can turn to recovering the graph of interdependencies between issuers and claims for a holder. It should be noted that it can be assumed that both individual user credentials and the recovery graph of interdependencies between issuers and claims for a holder are considered private and/or sensitive data that the holder does not wish to publicly share.

In some embodiments, the mechanisms described herein can recover the graph of independencies between issuers and claims for a holder or a portion of the graph using a dependency chain escrow.

In some embodiments, the dependency chain escrow implementation can include building a set of individually encrypted dependency descriptors. For example, each dependency descriptor can contain information associated with the issuer (e.g., an issuer identifier, an issuer name, etc.), the claims needed to resolve the issuer or a combination of claims and demonstrations needed for the issuer to generate and provide a verifiable claim, and/or metadata regarding which initial claim was last used to request a new claim from the issuer. In continuing this example, each of these encrypted blocks can be stored in one or more escrows or other trusted data storage providers and can be unlocked by a holder that is attempting to rebuild, reconstruct, or otherwise record a digital wallet associated with the holder.

It should be noted that these encrypted blocks can be stored in an auditable ledger. The auditable ledger can be any suitable type of log or ledger used for recording or storing dependency descriptors. For example, a blockchain ledger is an example of an auditable, append-only, publicly visible ledger that can be implemented in connection with the disclosed subject matter.

It should be also noted that any suitable encryption mechanisms can be used for different encrypted blocks. For example, a holder can use a property of the claim issued by a root issuer to unlock or access the remainder of the dependency descriptors corresponding to the depending issuers in a dependency chain from the root issuer. This can, for example, effectively cause a visit to the root issuer as the only step needed to completely restore all parts of a digital wallet that are dependent from the root issuer without requiring user intervention.

In some embodiments, the graph of interdependencies between issuers and claims can be divided among a plurality of parties (which is sometimes referred to as "graph splitting"). In a more particular example, a set of untrusted parties can each receive a portion of the graph (e.g., a particular set of dependency descriptors) and can store the received information along with an identifier (e.g., a holder identifier, a root issuer identifier, a timing identifier, etc.). In dividing the graph among multiple parties, it should be noted that no party can reconstruct the entire graph of interdependencies on their own or by colluding with a small subset of the other parties. This graph splitting implementation can, for example, be used as the graph of interdependencies between issuers and claims can be considered privacy-sensitive information.

Additionally or alternatively, in some embodiments, the keys, credentials, or other information can be cryptographically divided among a plurality of parties (which is sometimes referred to as "secret splitting"). In a more particular example, a set of untrusted parties can each receive a portion of key information and can store the received key portion along with an identifier (e.g., a holder identifier). In dividing the key information among multiple parties (e.g., two parties, three parties, ten parties, etc.), it should be noted that no individual party can reconstruct the key information on their own or by colluding with a small subset of the other parties. The secret splitting implementation can, for example, be used as key information is generally considered to be sensitive information.

In some embodiments, the mechanisms can include updating the graph of interdependencies between issuers and claims in response to a holder adding a new verifiable claim or new credential. In response to adding a new credential, a user device associated with a holder can store a copy of the entire graph in a digital wallet (e.g., a digital wallet application executing on the user device). For example, the digital wallet application executing on the user device can, in response to receiving a new credential, generate a new graph of interdependencies between issuers and claims that includes the new claim.

In continuing the secret splitting example above, in some embodiments, the digital wallet application can divide the new graph into multiple portions of the new graph. Each portion of the new graph can be transmitted to one of multiple backup parties, where the portion of the new graph can be signed with a root credential. It should be noted that any suitable credential can be associated with the portion of the new graph to identify the holder, the account associated with the digital wallet application, the root issuer, etc. It should also be noted that the root credential may be a credential within the graph.

In some embodiments, when recovering the graph of interdependencies between issuers and claims using the digital wallet application executing on the user device, the holder can restore their corresponding root credential. In response to restoring a root credential, the digital wallet application executing on the user device can transmit one or more messages to multiple backup providers, where each of the messages is digitally signed with the root credential. In response to each backup provider determining that the message was properly signed with the correct root credential, the backup provider can transmit their portion of the graph to the user device (e.g., a subset of dependency descriptors stored at that backup provider). As the user device receives these portions of the graph, the digital wallet application executing on the user device can rebuild or otherwise reconstruct the entire graph of interdependencies between issuers and claims locally on the user device. It should be noted that this reconstruction of the graph, which can include private information regarding the holder, the holder's associated issuers, and the holder's credentials and other identifying information, can occur on the user device and outside of a remote account server (e.g., the cloud).

It should be noted that, in some embodiments, the messages that are signed with the root credential can be combined with user-specific information, such as biometric data associated with the user, a user-provided password, etc. This can, for example, prevent an untrustworthy root node from attempting to recover a graph without a user's consent.

In some embodiments, upon reconstructing the graph on the user device using the portions of the graph from each of the backup providers, the digital wallet application executing on the user device can also transmit requests to each issuer in the graph, where the request can include the necessary credentials, claims, and/or demonstrations. In response, each issuer device can determine whether the necessary credentials, claims, and/or demonstrations have been received in the request and, in response, can transmit derived credentials, such as information relating to a reissued verifiable claim, to the user device for restoring within the graph.

It should be noted that the requests, messages, or communications described herein can be transmitted over an anonymization layer or mix network. A mix network can be any suitable collection of routers or other network components that use a layered encryption technique to cryptographically encode data and route information as messages pass through the network and uses permutations to provide anonymity. This can, for example, prevent a network sniffer from obtaining the set of servers a given recovering user or associated digital wallet application is talking to and reconstructing their graph.

System Overview

Figure 4:
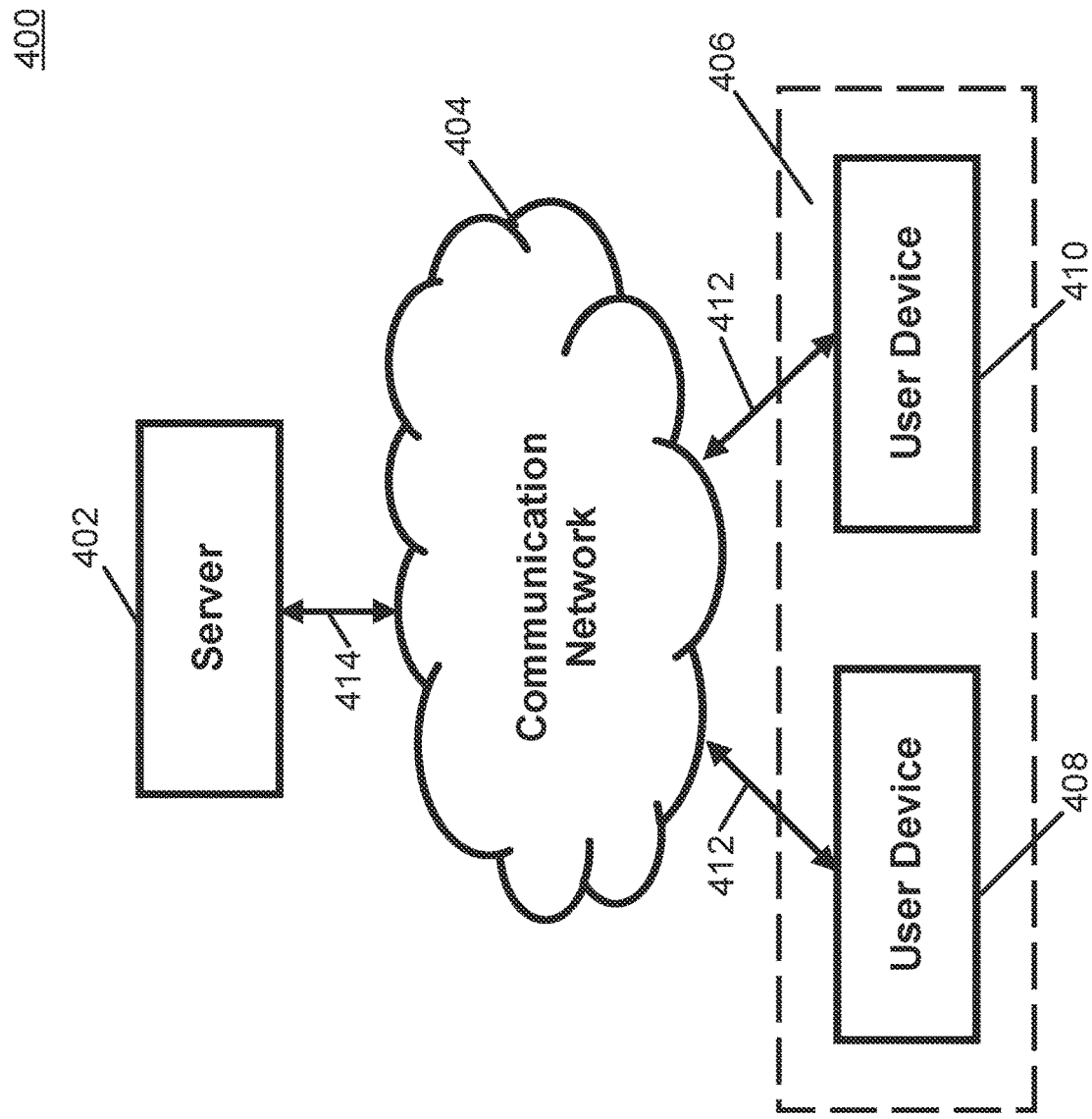
FIG. 4 shows a schematic diagram of an illustrative system suitable for implementation of mechanisms described herein for recovering identity information in verifiable claims-based systems in accordance with some embodiments of the disclosed subject matter.

Turning to FIG. 4, an illustrative example 400 of hardware for auditing and notifying users concerning verifiable claims that can be used in accordance with some embodiments of the disclosed subject matter is shown. As illustrated, hardware 400 can include a server 402, a communication network 404, and/or one or more user devices 406, such as user devices 408 and 410.

Server 402 can be any suitable server(s) for storing information, data, programs, and/or any other suitable type of content. Additionally, in some embodiments, server 402 can, in response to receiving root credentials from a user device, be used to transmit portions of the graph of interdependencies between issuers and claims for a holder such that the user device can begin to reconstruct the graph on the user device. For example, in some embodiments, each of multiple servers 402 can store a particular portion of dependency descriptor blocks and can transmit the portion of dependency descriptor blocks associated with a holder in response to receiving the correct root credentials and/or any other suitable information (e.g., biometric information, a user-generated password, etc.), as described above in more detail in connection with FIGS. 1A-1D, 2A-2C, and 3A-3B.

Communication network 404 can be any suitable combination of one or more wired and/or wireless networks in some embodiments. For example, communication network 404 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 406 can be connected by one or more communications links (e.g., communications links 412) to communication network 404 that can be linked via one or more communications links (e.g., communications links 414) to server 402. The communications links can be any communications links suitable for communicating data among user devices 406 and server 402 such as network links, dial-up links, wireless links, hard-wired links, any other suitable communications links, or any suitable combination of such links.

User devices 406 can include any one or more user devices suitable for carrying a verifiable claim and/or requesting that data is stored in an auditable ledger. For example, in some embodiments, user devices 406 can receive a request to restore a graph of interdependencies between issuers and claims, restore their corresponding root credential, transmit one or more messages to multiple backup providers in which each of the messages is digitally signed with the root credential, receive portions of the graph or associated dependency descriptor blocks from each back provider, transmit requests to each issuer in the graph in which the request can include the necessary credentials, claims, and/or demonstrations to obtain a reissued claim, and/or perform any other suitable functions. In some embodiments, user devices 406 can include any suitable types of devices. For example, in some embodiments, user devices 406 can include a mobile phone, a tablet computer, a wearable computer, a desktop computer, a laptop computer, television, speakers, a media player, a vehicle entertainment system, and/or any other suitable type of user device.

Although server 402 is illustrated as one device, the functions performed by server 402 can be performed using any suitable number of devices in some embodiments. For example, in some embodiments, multiple devices can be used to implement the functions performed by server 402.

Although two user devices 408 and 410 are shown in FIG. 4 to avoid over-complicating the figure, any suitable number of user devices, and/or any suitable types of user devices, can be used in some embodiments.

Figure 5:
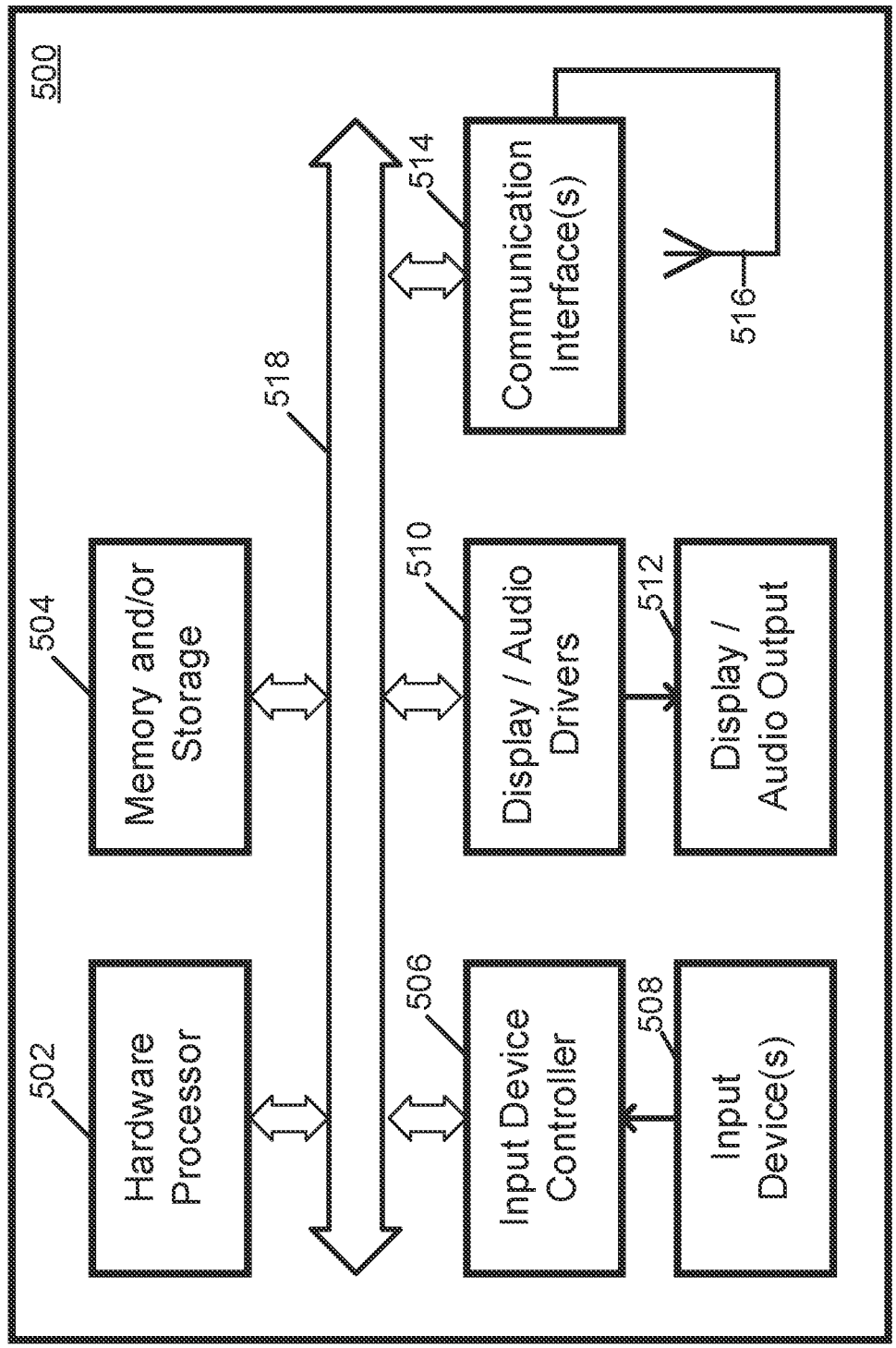
FIG. 5 shows a detailed example of hardware that can be used in a server and/or a user device of FIG. 4 in accordance with some embodiments of the disclosed subject matter.

Server 402 and user devices 406 can be implemented using any suitable hardware in some embodiments. For example, in some embodiments, devices 402 and 406 can be implemented using any suitable general-purpose computer or special-purpose computer. For example, a mobile phone may be implemented using a special-purpose computer. Any such general-purpose computer or special-purpose computer can include any suitable hardware. For example, as illustrated in example hardware 500 of FIG. 5, such hardware can include hardware processor 502, memory and/or storage 504, an input device controller 506, an input device 508, display/audio drivers 510, display and audio output circuitry 512, communication interface(s) 514, an antenna 516, and a bus 518.

Hardware processor 502 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 502 can be controlled by a server program stored in memory and/or storage of a server, such as server 502. For example, in some embodiments, the server program can cause hardware processor 502 to determine that a message from a user device was properly signed with the correct root credential, transmit a portion of the graph that is stored in memory and/or storage 504 and that corresponds to the holder associated with the root credential to the user device. In another example, in some embodiments, the server program can cause hardware processor 502 to determine whether the message received from the user device was properly signed with the correct root credential and whether the message received from the user device included the correct user-specific information (e.g., biometric data associated with the user, a user-provided password, etc.). In yet another example, in some embodiments, the server program can cause hardware processor 502 to receive a request from a user device, determine whether the necessary credentials, claims, and/or demonstrations have been received in the request, and transmit derived credentials, such as information relating to a reissued verifiable claim, to the user device for restoring within the graph.

Memory and/or storage 504 can be any suitable memory and/or storage for storing programs, data, and/or any other suitable information in some embodiments. For example, memory and/or storage 504 can include random access memory, read-only memory, flash memory, hard disk storage, optical media, and/or any other suitable memory.

Input device controller 506 can be any suitable circuitry for controlling and receiving input from one or more input devices 508 in some embodiments. For example, input device controller 506 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 510 can be any suitable circuitry for controlling and driving output to one or more display/audio output devices 512 in some embodiments. For example, display/audio drivers 510 can be circuitry for driving a touchscreen, a flat-panel display, a cathode ray tube display, a projector, a speaker or speakers, and/or any other suitable display and/or presentation devices.

Communication interface(s) 514 can be any suitable circuitry for interfacing with one or more communication networks (e.g., computer network 404). For example, interface(s) 514 can include network interface card circuitry, wireless communication circuitry, and/or any other suitable type of communication network circuitry.

Antenna 516 can be any suitable one or more antennas for wirelessly communicating with a communication network (e.g., communication network 404) in some embodiments. In some embodiments, antenna 516 can be omitted.

Bus 518 can be any suitable mechanism for communicating between two or more components 502, 504, 506, 510, and 514 in some embodiments.

Any other suitable components can be included in hardware 500 in accordance with some embodiments.

In some embodiments, at least some of the above described blocks of the processes of FIGS. 1A-1D, 2A-2C, and 3A-3B can be executed or performed in any order or sequence not limited to the order and sequence shown in and described in connection with the figures. Also, some of the above blocks of FIGS. 1A-1D, 2A-2C, and 3A-3B can be executed or performed substantially simultaneously where appropriate or in parallel to reduce latency and processing times. Additionally or alternatively, some of the above described blocks of the processes of FIGS. 1A-1D, 2A-2C, and 3A-3B can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, identity systems, methods, and media for recovering identity information in verifiable claims-based systems.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for restoring user credentials, the method comprising:
   receiving, using a hardware processor of a computing device, a request to locally restore a digital wallet of a holder associated with a digital wallet application executing on the computing device; and
   restoring, using the hardware processor, the digital wallet by:
   restoring a root credential;
   transmitting a plurality of messages that are each signed with the root credential to a plurality of backup providers, wherein each of the plurality of backup providers has a portion of a graph of interdependencies, wherein the graph of interdependencies is between a plurality of issuers and a plurality of claims for the holder and wherein the graph of interdependencies is unable to be reconstructed from the portion;

receiving a plurality of graph portions from at least a portion of the plurality of backup providers in response to each of the portion of the plurality of backup providers determining that the root credential is a correct root credential corresponding to the holder; and reconstructing the graph of interdependencies using the plurality of received graph portions.

2. The method of claim 1, further comprising:

transmitting a request to each of the plurality of issuers in the graph of interdependencies between the plurality of issuers and the plurality of claims for the holder, wherein the request includes at least one claim from the plurality of claims for the holder.

3. The method of claim 2, further comprising:

receiving, from an issuer device, derived credentials relating to a reissued verifiable claim; and restoring a claim in the graph of interdependencies between the plurality of issuers and the plurality of claims for the holder with the reissued verifiable claim.

4. The method of claim 1, wherein each of the plurality of claims is data demonstrating a property signed by an issuer.

5. The method of claim 1, wherein the plurality of issuers include a subset of root issuers and a subset of depending issuers, wherein each of the subset of root issuers requires a demonstration of identity by the holder, and wherein each of the subset of depending issuers generates and provides a reissued verifiable claim without user action.

6. The method of claim 1, wherein the graph of interdependencies between the plurality of issuers and the plurality of claims for the holder is reconstructed by tracing dependency chains in a backwards direction from a depending issuer from the plurality of issuers.

7. The method of claim 1, wherein the graph of interdependencies between the plurality of issuers and the plurality of claims for the holder is reconstructed by tracing dependency chains in a forward direction from a root issuer from the plurality of issuers.

8. The method of claim 1, wherein each of the plurality of messages that is signed with the root credential is combined with user-specific information.

9. The method of claim 8, wherein the user-specific information is biometric data.

10. The method of claim 8, wherein the user-specific information is a user-provided password.

11. A system for restoring user credentials, the system comprising:

a hardware processor of a computing device that is configured to:

receive a request to locally restore a digital wallet of a holder associated with a digital wallet application executing on the computing device; and restore the digital wallet by:

restoring a root credential;

transmitting a plurality of messages that are each signed with the root credential to a plurality of backup providers, wherein each of the plurality of backup providers has a portion of a graph of interdependencies, wherein the graph of interdependencies is between a plurality of issuers and a plurality of claims for the holder stored in a storage device and wherein the graph of interdependencies is unable to be reconstructed from the portion;

receiving a plurality of graph portions from at least a portion of the plurality of backup providers in response to each of the portion of the plurality of backup providers determining that the root credential is a correct root credential corresponding to the holder; and reconstructing the graph of interdependencies using the plurality of received graph portions.

12. The system of claim 11, wherein the hardware processor is further configured to transmit a request to each of the plurality of issuers in the graph of interdependencies between the plurality of issuers and the plurality of claims for the holder, wherein the request includes at least one claim from the plurality of claims for the holder.

13. The system of claim 12, wherein the hardware processor is further configured to:

receive, from an issuer device, derived credentials relating to a reissued verifiable claim; and restore a claim in the graph of interdependencies between the plurality of issuers and the plurality of claims for the holder with the reissued verifiable claim.

14. The system of claim 11, wherein each of the plurality of claims is data demonstrating a property signed by an issuer.

15. The system of claim 11, wherein the plurality of issuers include a subset of root issuers and a subset of depending issuers, wherein each of the subset of root issuers requires a demonstration of identity by the holder, and wherein each of the subset of depending issuers generates and provides a reissued verifiable claim without user action.

16. The system of claim 11, wherein the graph of interdependencies between the plurality of issuers and the plurality of claims for the holder is reconstructed by tracing dependency chains in a backwards direction from a depending issuer from the plurality of issuers.

17. The system of claim 11, wherein the graph of interdependencies between the plurality of issuers and the plurality of claims for the holder is reconstructed by tracing dependency chains in a forward direction from a root issuer from the plurality of issuers.

18. The system of claim 11, wherein each of the plurality of messages that is signed with the root credential is combined with user-specific information.

19. The system of claim 18, wherein the user-specific information is biometric data.

20. The system of claim 18, wherein the user-specific information is a user-provided password.

21. A non-transitory computer-readable medium containing computer executable instructions that, when executed by a processor, cause the processor to perform a method for restoring user credentials, the method comprising:

receiving, using the processor, a request to locally restore a digital wallet of a holder associated with a digital wallet application executing on the computing device; and restoring, using the processor, the digital wallet by:

restoring a root credential;

transmitting a plurality of messages that are each signed with the root credential to a plurality of backup providers, wherein each of the plurality of backup providers has a portion of a graph of interdependencies, wherein the graph of interdependencies is between a plurality of issuers and a plurality of claims for the holder and wherein the graph of interdependencies is unable to be reconstructed from the portion;

receiving a plurality of graph portions from at least a portion of the plurality of backup providers in response to each of the portion of the plurality of backup providers determining that the root credential is a correct root credential corresponding to the holder; and reconstructing the graph of interdependencies using the plurality of received graph portions.

\* \* \* \* \*